United States Patent
Kawashiro et al.

(10) Patent No.: US 9,392,011 B2
(45) Date of Patent: Jul. 12, 2016

(54) WEB VULNERABILITY REPAIR APPARATUS, WEB SERVER, WEB VULNERABILITY REPAIR METHOD, AND PROGRAM

(75) Inventors: Hiroto Kawashiro, Tokyo (JP); Masahiro Asano, Ishikawa (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 13/811,060

(22) PCT Filed: Jul. 19, 2011

(86) PCT No.: PCT/JP2011/004083
§ 371 (c)(1),
(2), (4) Date: Jan. 18, 2013

(87) PCT Pub. No.: WO2012/011270
PCT Pub. Date: Jan. 26, 2012

(65) Prior Publication Data
US 2013/0133076 A1    May 23, 2013

(30) Foreign Application Priority Data
Jul. 21, 2010    (JP) ................................ 2010-164304

(51) Int. Cl.
H04L 29/06       (2006.01)
G06F 21/57       (2013.01)

(52) U.S. Cl.
CPC .......... *H04L 63/1433* (2013.01); *G06F 21/577* (2013.01)

(58) Field of Classification Search
CPC . H04L 63/1433; H04L 63/1441; G06F 21/55; G06F 21/577

USPC ................................ 726/22, 23, 25; 713/188
See application file for complete search history.

(56) References Cited

U.S. PATENT DOCUMENTS

| | | | |
|---|---|---|---|
| 6,185,689 B1* | 2/2001 | Todd et al. ....................... 726/25 |
| 7,793,338 B1* | 9/2010 | Beddoe et al. .................... 726/3 |
| 8,037,529 B1* | 10/2011 | Chiueh ............... G06F 11/3604 713/188 |
| 8,819,637 B2* | 8/2014 | Abadi .................. G06F 21/577 707/759 |
| 2001/0034847 A1* | 10/2001 | Gaul, Jr. ....................... 713/201 |

(Continued)

FOREIGN PATENT DOCUMENTS

| JP | 2002-157221 A | 5/2002 |
|---|---|---|
| JP | 2002-328896 A | 11/2002 |

(Continued)

OTHER PUBLICATIONS

Communication dated Dec. 16, 2014, issued by the Japanese Patent Office in counterpart Japanese application No. 2010-164304.

*Primary Examiner* — Sarah Su
(74) *Attorney, Agent, or Firm* — Sughrue Mion, PLLC

(57) ABSTRACT

A Web vulnerability repair apparatus (50) detects the presence of a vulnerability of a Web application of a Web server (30) and the type of the vulnerability. The Web vulnerability repair apparatus (50) can acquire countermeasure information aimed to repair the vulnerability, according to the type of vulnerability. In addition, the Web vulnerability repair apparatus (50) repairs the vulnerability of the Web application of the Web server (30) using the countermeasure information. By this repair, it is possible to improve the security during the period from the time when a vulnerable part in a Web application is discovered to the time when it is manually repaired.

12 Claims, 10 Drawing Sheets

(56) References Cited

U.S. PATENT DOCUMENTS

| | | | |
|---|---|---|---|
| 2002/0133606 A1 | 9/2002 | Mitomo et al. | |
| 2004/0168085 A1 | 8/2004 | Omote et al. | |
| 2004/0215978 A1* | 10/2004 | Okajo et al. | 713/201 |
| 2005/0039046 A1* | 2/2005 | Bardsley et al. | 713/201 |
| 2005/0198527 A1 | 9/2005 | Johnson et al. | |
| 2006/0277539 A1* | 12/2006 | Amarasinghe | G06F 21/53 717/168 |
| 2006/0282897 A1* | 12/2006 | Sima et al. | 726/25 |
| 2007/0061877 A1* | 3/2007 | Sima et al. | 726/12 |
| 2007/0094735 A1* | 4/2007 | Cohen | G06F 21/577 726/25 |
| 2007/0169199 A1* | 7/2007 | Quinnell et al. | 726/25 |
| 2007/0192867 A1* | 8/2007 | Miliefsky | 726/25 |
| 2009/0119777 A1* | 5/2009 | Jeon | H04L 63/1433 726/25 |
| 2010/0325412 A1* | 12/2010 | Norrman et al. | 713/100 |
| 2013/0019314 A1* | 1/2013 | Ji et al. | 726/25 |

FOREIGN PATENT DOCUMENTS

| | | |
|---|---|---|
| JP | 2002-342279 A | 11/2002 |
| JP | 2004-258777 A | 9/2004 |
| JP | 2005-134995 A | 5/2005 |
| JP | 2007-047884 A | 2/2007 |
| JP | 2007-241906 A | 9/2007 |

* cited by examiner

| VULNERABILITY ID | TYPES OF VULNERABILITY | COUNTERMEASURE INFORMATION |
|---|---|---|
| 001 | XSS VULNERABILITY | CHECK FOR WHETHER OR NOT THERE EXISTS A SYMBOL, WHICH MAKES INSERTED SCRIPTS ENABLE, OR AN EXPRESSION, WHICH CORRESPONDS TO TAGS OR COMMAND SYNTAX, AND BLOCK COMMUNICATION IF THERE EXISTS |
| 002 | SQL INJECTION | CHECK FOR WHETHER OR NOT THERE EXISTS AN EXPRESSION WHICH CORRESPONDS TO SYMBOLS OR COMMAND SYNTAX WITH WHICH SQL SENTENCE CAN BE CHANGED, AND BLOCK COMMUNICATION IF THERE EXISTS |
| 003 | EXECUTION OF COMMANDS | CHECK FOR WHETHER OR NOT THERE EXISTS AN EXPRESSION WHICH CORRESPONDS TO SYMBOLS OR COMMAND SYNTAX WITH WHICH A COMMAND CAN BE EXECUTED, AND BLOCK COMMUNICATION IF THERE EXISTS |
| 004 | BUFFER OVERFLOW | COMPARE SIZE OF INPUT DATA WITH REFERENCE VALUE, AND BLOCK COMMUNICATION WHEN IT IS DETERMINED THAT THERE IS RISK |
| 005 | APPLICATION ERROR | CHECK FOR WHETHER OR NOT THERE EXISTS DATA WHICH CAUSES DISCLOSURE OF SERVER'S INFORMATION OR SERVER'S SPECIFICATION DUE TO ABNORMALITIES IN APPLICATIONS, AND BLOCK COMMUNICATION IF THERE EXISTS |
| 006 | LEAKAGE OF COOKIE | MODIFY RETURN TELEGRAM CONTENT SO THAT COOKIE INFORMATION IS NOT ENCODED AND STORED IN TERMINAL |
| 007 | DIVISION OF TELEGRAM | CHECK FOR WHETHER OR NOT THERE EXISTS CHARACTER ENCODING THAT ILLEGALLY DIVIDES TELEGRAM, AND BLOCK COMMUNICATION IF THERE EXISTS |
| 008 | FILE PARAMETER TAMPERING | CHECK FOR WHETHER OR NOT THERE EXISTS AN EXPRESSION WHICH CAUSES ACCESS TO UNEXPECTED FILES, AND BLOCK COMMUNICATION IF THERE EXISTS |
| 009 | LEAKAGE OF ENCODED PAGE | MODIFY RETURN TELEGRAM CONTENT SO THAT PAGE CONTENT IS NOT STORED IN TERMINAL |
| 010 | INAPPROPRIATE EXPIRATION DATE | MODIFY NOTATION OF EXPIRATION TIME SO THAT INAPPROPRIATE MANAGEMENT OF EXPIRATION TIME IS NOT PERFORMED |

WEB VULNERABILITY REPAIR APPARATUS, WEB SERVER, WEB VULNERABILITY REPAIR METHOD, AND PROGRAM

CROSS REFERENCE TO RELATED APPLICATIONS

This application is a National Stage of International Application No. PCT/JP2011/004083 filed Jul. 19, 2011, claiming priority based on Japanese Patent Application No. 2010-164304, filed Jul. 21, 2010, the contents of all of which are incorporated herein by reference in their entirety.

TECHNICAL FIELD

The present invention relates to a Web vulnerability repair apparatus, a Web server, a Web vulnerability repair method, and a program that repair the vulnerability of Web applications.

BACKGROUND ART

In order to improve the security of Web applications, there is a technique of diagnosing vulnerable parts of the Web applications in advance. For example, Patent Document 1 discloses that when parameters are designated, vulnerability inspection processing is performed by determining inspection items corresponding to the designated parameters using a configuration file showing the correspondence between the parameters to be inspected and the inspection items.

RELATED DOCUMENT

Patent Document

[Patent Document 1] Japanese Unexamined Patent Application Publication No. 2005-134995

DISCLOSURE OF THE INVENTION

When a vulnerable part is discovered in a Web application, it is necessary to repair the vulnerable part to improve the security. In order to repair the Web application properly, it is necessary to repair the Web application manually. For this reason, a certain amount of time has been required to complete repair after a vulnerable part is discovered. Therefore, it has been impossible to improve the security during this certain amount of time.

It is an object of the present invention to provide a Web vulnerability repair apparatus, a Web server, a Web vulnerability repair method, and a program capable of improving the security during the period from the time when a vulnerable part in a Web application is discovered to the time when it is manually repaired.

According to the present invention, there is provided a Web vulnerability repair apparatus comprising: a connection unit that connects to a countermeasure information storage unit, which stores vulnerability specification information and countermeasure information indicating a method of repairing vulnerability indicated by the vulnerability specification information so as to be corresponded with each other for each type of vulnerability of a Web application; a vulnerability information acquisition unit that acquires the vulnerability specification information specifying the type of vulnerability of a target Web application; and an output unit that connects to the countermeasure information storage unit through the connection unit, acquires the countermeasure information corresponding to the vulnerability specification information acquired by the vulnerability information acquisition unit, and outputs the acquired countermeasure information.

According to the present invention, there is provided a Web server comprising: a service provision unit that provides a Web application; and a repair unit that repairs a vulnerability of the target Web application by running a program aimed to repair the vulnerability of the Web application, acquiring, from the outside, countermeasure information indicating a way of repairing the vulnerability, and loading the countermeasure information into the program.

According to the present invention, there is provided a Web vulnerability repair apparatus comprising: a connection unit that connects to a repair program storage unit, which stores vulnerability specification information and a repair program aimed to repair a vulnerability indicated by the vulnerability specification information so as to be corresponded with each other, for each type of a vulnerability of a Web application; a vulnerability information acquisition unit that acquires the vulnerability specification information specifying the type of a vulnerability of the target Web application; and a repair unit that connects to the repair program storage unit through the connection unit, acquires the repair program corresponding to the vulnerability specification information acquired by the vulnerability information acquisition unit, and repairs the vulnerability of the target Web application using the acquired repair program.

According to the present invention, there is provided a Web vulnerability repair method comprising: connecting, performed by a computer, to a countermeasure information storage unit, which stores vulnerability specification information and countermeasure information indicating a method of repairing vulnerability indicated by the vulnerability specification information so as to be corresponded with each other for each type of vulnerability of a Web application; acquiring, performed by the computer, the vulnerability specification information specifying the type of vulnerability of a target Web application; and connecting, to the countermeasure information storage unit through the connection unit, acquiring the countermeasure information corresponding to the vulnerability specification information acquired by the vulnerability information acquisition unit, and sending the acquired countermeasure information to a Web server providing the Web application, performed by the computer.

According to the present invention, there is provided a Web vulnerability repair method comprising: providing, performed by a computer, a Web application; and repairing, performed by the computer, a vulnerability of the target Web application by running a program aimed to repairing the vulnerability of the Web application, acquiring, from the outside, countermeasure information indicating a way of repairing the vulnerability, and loading the countermeasure information into the program.

According to the present invention, there is provided a Web vulnerability repair method comprising: connecting, performed by a computer, to a repair program storage unit, which stores vulnerability specification information and a repair program aimed to repair a vulnerability indicated by the vulnerability specification information so as to be corresponded with each other, for each type of a vulnerability of a Web application; acquiring, performed by the computer, the vulnerability specification information specifying the type of a vulnerability of the target Web application; and acquiring the repair program corresponding to the acquired vulnerability specification information, and repairing the vulnerability of the target Web application using the acquired repair program, performed by the computer.

According to the present invention, there is provided a program causing a computer to function as a Web vulnerability repair apparatus. The program causes the computer to implement: a function of connecting to a countermeasure information storage unit, which stores vulnerability specification information and countermeasure information indicating a method of repairing vulnerability indicated by the vulnerability specification information so as to be corresponded with each other for each type of vulnerability of a Web application; a function of acquiring the vulnerability specification information specifying the type of vulnerability of a target Web application; and a function of acquiring the countermeasure information corresponding to the acquired vulnerability specification information, and sending the acquired countermeasure information to a Web server providing the Web application.

According to the present invention, there is provided a program that causes a Web server to have a function of repairing vulnerability of a Web application and resides on the Web server. The program causes the Web server to implement a function of residing on the Web server, acquiring, from the outside, countermeasure information which indicates a way of repairing the vulnerability, and repairing the target Web application using the acquired countermeasure information.

According to the present invention, there is provided a program causing a computer to function as a Web vulnerability repair apparatus. The program causes the computer to implement: a function of connecting to a repair program storage unit, which stores vulnerability specification information and a repair program aimed to repair a vulnerability indicated by the vulnerability specification information so as to be corresponded with each other, for each type of a vulnerability of a Web application; a function of acquiring the vulnerability specification information specifying the type of a vulnerability of the target Web application; and a function of acquiring the repair program corresponding to the acquired vulnerability specification information, and repairing the vulnerability of the target Web application using the acquired repair program.

According to the present invention, it is possible to improve the security during the period from the time when a vulnerable part in a Web application is discovered to the time when it is manually repaired.

BRIEF DESCRIPTION OF THE DRAWINGS

The above-described object and other objects, features, and advantages will become more apparent by preferred embodiments described below and the following accompanying drawings.

FIG. 4 is a view for explaining an example of data stored in a countermeasure information storage unit.

DESCRIPTION OF EMBODIMENTS

Figure 1:
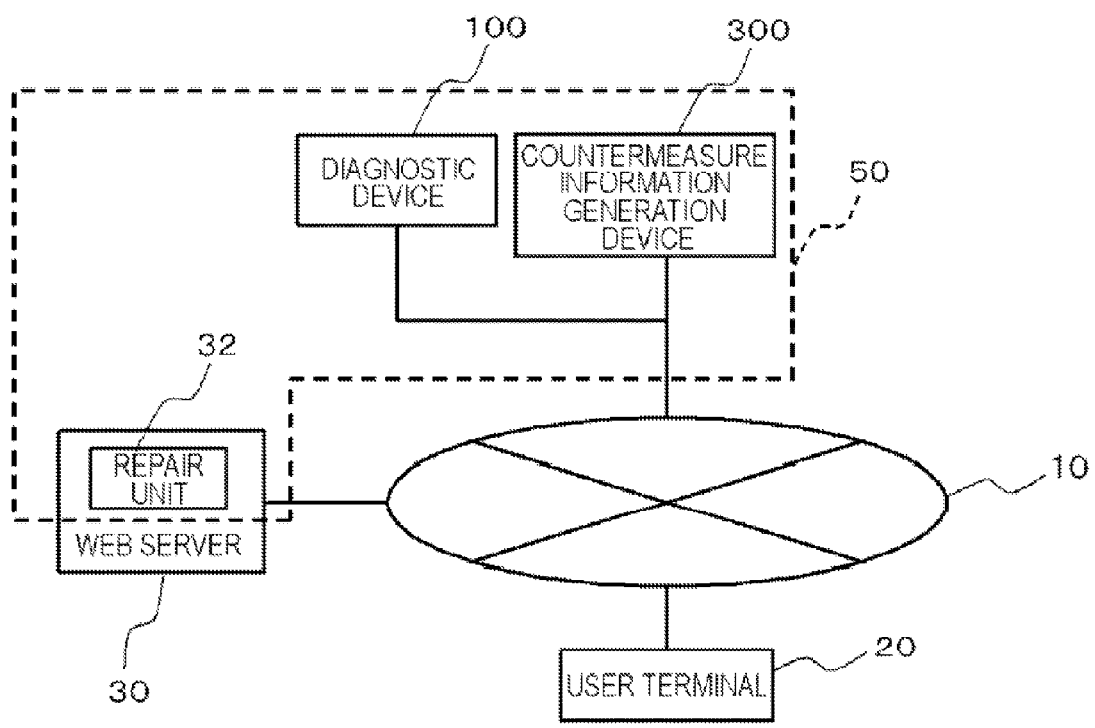
FIG. 1 is a view for explaining the usage environment of a Web vulnerability repair apparatus according to a first embodiment.

Hereinafter, embodiments of the present invention will be described using the drawings. In addition, the same components are denoted by the same reference numerals in all drawings, and explanation thereof will not be repeated.

(First Embodiment)

FIG. 1 is a view for explaining the usage environment of a Web vulnerability repair apparatus 50 according to the first embodiment. The Web vulnerability repair apparatus 50 is a device that repairs the vulnerability of Web applications that a Web server 30 provides to a user terminal 20. The Web vulnerability repair apparatus 50 detects the presence of vulnerability of a Web application of the Web server 30 and the type of the vulnerability. The Web vulnerability repair apparatus 50 can acquire countermeasure information for repairing the vulnerability, according to the type of vulnerability. In addition, the Web vulnerability repair apparatus 50 repairs the vulnerability of Web applications of the Web server 30 using the countermeasure information. By this repair, it is possible to improve the security during the period from the time when a vulnerable part in a Web application is discovered to the time when it is manually repaired.

In the present embodiment, the Web vulnerability repair apparatus 50 includes a diagnostic device 100, a countermeasure information generation device 300, and a repair unit 32. The repair unit 32 is a program aimed to repair a vulnerability, and is installed in the Web server 30. The program implemented as the repair unit 32 resides on the Web server 30, for example. In addition, the diagnostic device 100 and the countermeasure information generation device 300 are connected to the Web server 30 through a global network 10.

Figure 2:
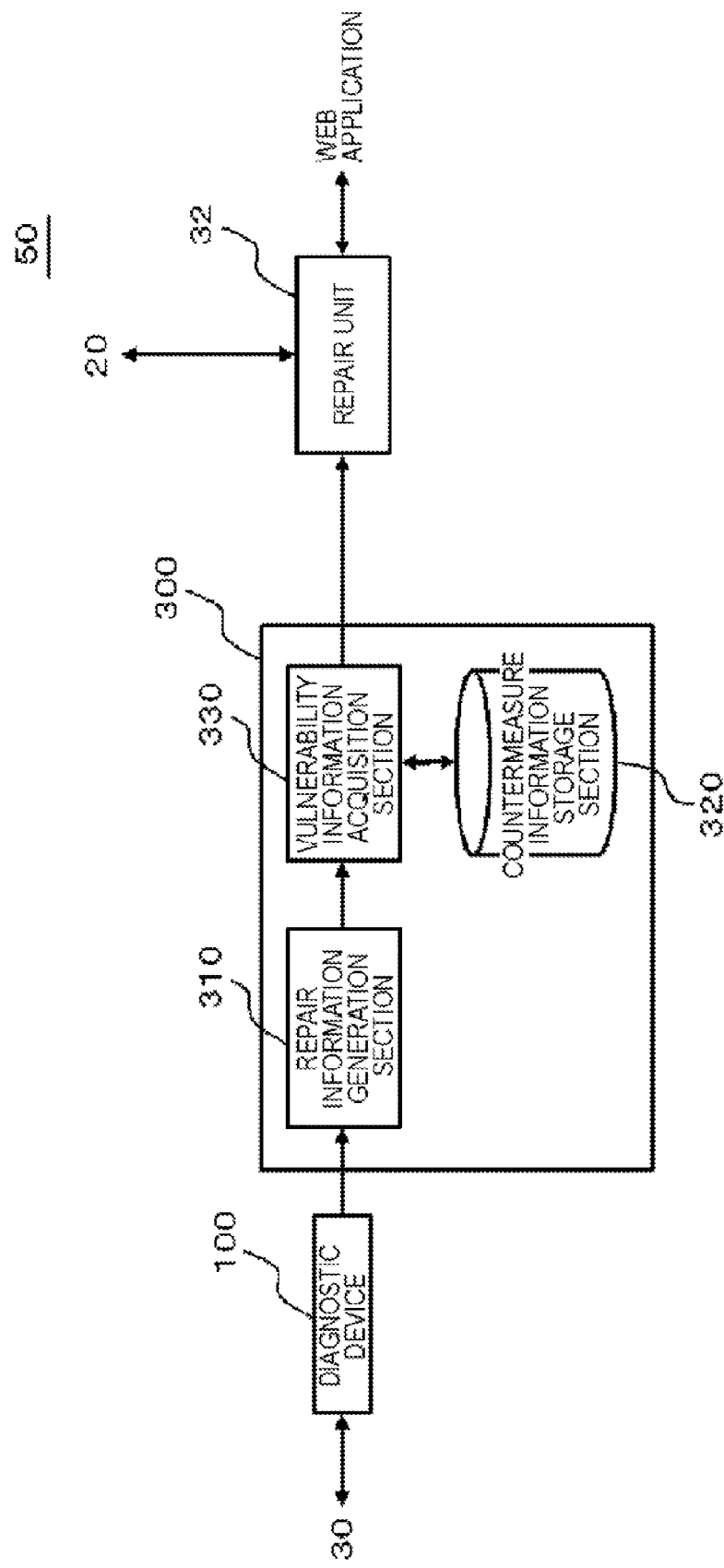
FIG. 2 is a block diagram showing the functional configuration of the Web vulnerability repair apparatus.

FIG. 2 is a block diagram showing the functional configuration of the Web vulnerability repair apparatus 50. The Web vulnerability repair apparatus 50 includes the diagnostic device 100, the repair unit 32, and the countermeasure information generation device 300 as described above.

The diagnostic device 100 determines the presence of vulnerability of a Web application of the Web server 30 and the type of the vulnerability by analyzing the Web application, and generates a vulnerability ID (vulnerability specification information). The Vulnerability ID is information which specifies the type of vulnerability of a Web application of the Web server 30. The diagnostic device 100 determines the presence of a vulnerable point in a Web application and its type by performing a pseudo-attack on the Web application using input parameters, for example. Note that, the analysis method of the diagnostic device 100 is not limited to this.

The countermeasure information generation device 300 includes a vulnerability information acquisition unit 310 and a repair information generation unit 330. The vulnerability information acquisition unit 310 acquires a vulnerability ID from the diagnostic device 100. The repair information generation unit 330 connects to a countermeasure information storage unit 320. In the countermeasure information storage unit 320, a vulnerability ID and countermeasure information, which indicates a method of repairing the vulnerability indicated by the vulnerability ID, are stored so as to correspond with each other, for each type of vulnerability of Web applications. In the present embodiment, the countermeasure information storage unit 320 is formed as a part of the countermeasure information generation device 300. Next, the repair information generation unit 330 acquires countermeasure information corresponding to the vulnerability ID, which the vulnerability information acquisition unit 310 has acquired, from the countermeasure information storage unit 320. Then, the repair information generation unit 330 sends the acquired countermeasure information to the repair unit 32 of the Web server 30.

In addition, the repair unit 32 of the Web server 30 repairs the vulnerability of the Web application by reading the countermeasure information sent from the repair information generation unit 330.

Note that, each component of the Web vulnerability repair apparatus 50 shown in FIG. 2 is not a configuration in a hardware unit but a block in a functional unit. Each component of the Web vulnerability repair apparatus 50 is implemented by any combination of hardware and software based on a CPU, a memory, a program for implementing a component of this drawing which is loaded on the memory, a storage unit such as a hard disk which stores the program, and an interface for network connection, which are of any computer. In addition, there are various modifications in the implementation method and the apparatus.

Figure 3:
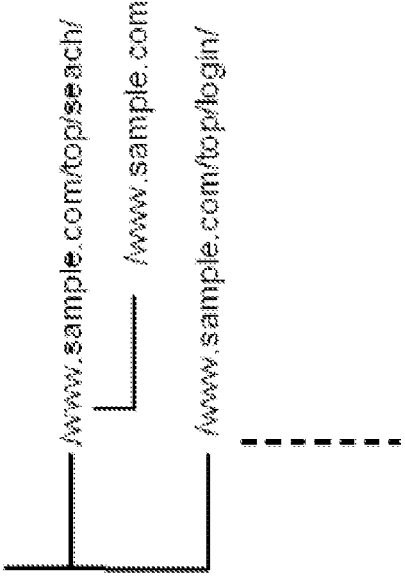
FIG. 3 is a view illustrating an example of the Web application diagnosis result of a diagnostic device.

FIG. 3 is a view illustrating an example of the Web application diagnosis result of the diagnostic device 100. The diagnostic device 100 outputs information, which specifies a vulnerable point in a Web application and a vulnerability ID indicating the type of the vulnerability. For example, the information that specifies a vulnerable point is a combination of a URL and information, which combination specifies a parameter used in the Web application and corresponding to the cause of the vulnerability.

FIG. 4 is a view for explaining an example of data stored in the countermeasure information storage unit 320. Among the data shown in this drawing, types of vulnerability need not to be stored in the countermeasure information storage unit 320. However, the types of vulnerability are also shown for the sake of explanation herein.

As described above, the countermeasure information storage unit 320 stores the countermeasure information and correspond it to the vulnerability ID. For example, countermeasure information corresponding to the vulnerability relating to cross-site scripting (XSS) indicates checking for whether or not there exists a symbol, which makes inserted scripts enable, or an expression, corresponds to tags or command syntax, and blocking the communication if there exists. Countermeasure information corresponding to the vulnerability relating to SQL injection indicates checking for whether or not there exists an expression which corresponds to symbols or command syntax with which a SQL sentence can be falsified, and blocking the communication if there exists. Countermeasure information corresponding to the vulnerability due to the execution of commands indicates checking for whether or not there exists an expression which corresponds to symbols or command syntax with which a command can be executed, and blocking the communication if there exists. Countermeasure information corresponding to the vulnerability due to buffer overflow indicates comparing the size of input data with the reference value and blocking the communication when it is determined that there is a risk. Countermeasure information corresponding to the vulnerability due to an application error indicates checking for whether or not there exists data which causes disclosure of server's information or server's specification due to the abnormalities in applications, and blocking the communication if there exists. Countermeasure information corresponding to the vulnerability due to the leakage of Cookie indicates performing a process of modifying the return telegram content so that the Cookie information is not encoded and stored in a terminal. Countermeasure information corresponding to the division of a telegram indicates checking for whether there exists a character encoding that illegally divides telegram, and blocking the communication if there exists. Countermeasure information corresponding to the file parameter tampering indicates checking an expression for access to unexpected files, and blocking the communication if applicable. The expression checked herein is defined by the analysis of the diagnostic device 100, for example. Countermeasure information corresponding to the leakage of the encoded page indicates modifying the return telegram content so that the page content is not stored in a terminal. Countermeasure information corresponding to the case where an inappropriate expiration time is detected indicates modifying a notation of the expiration time so that inappropriate management of expiration time is not performed.

Note that, the types of vulnerability and countermeasure information described above are examples.

Figure 5:
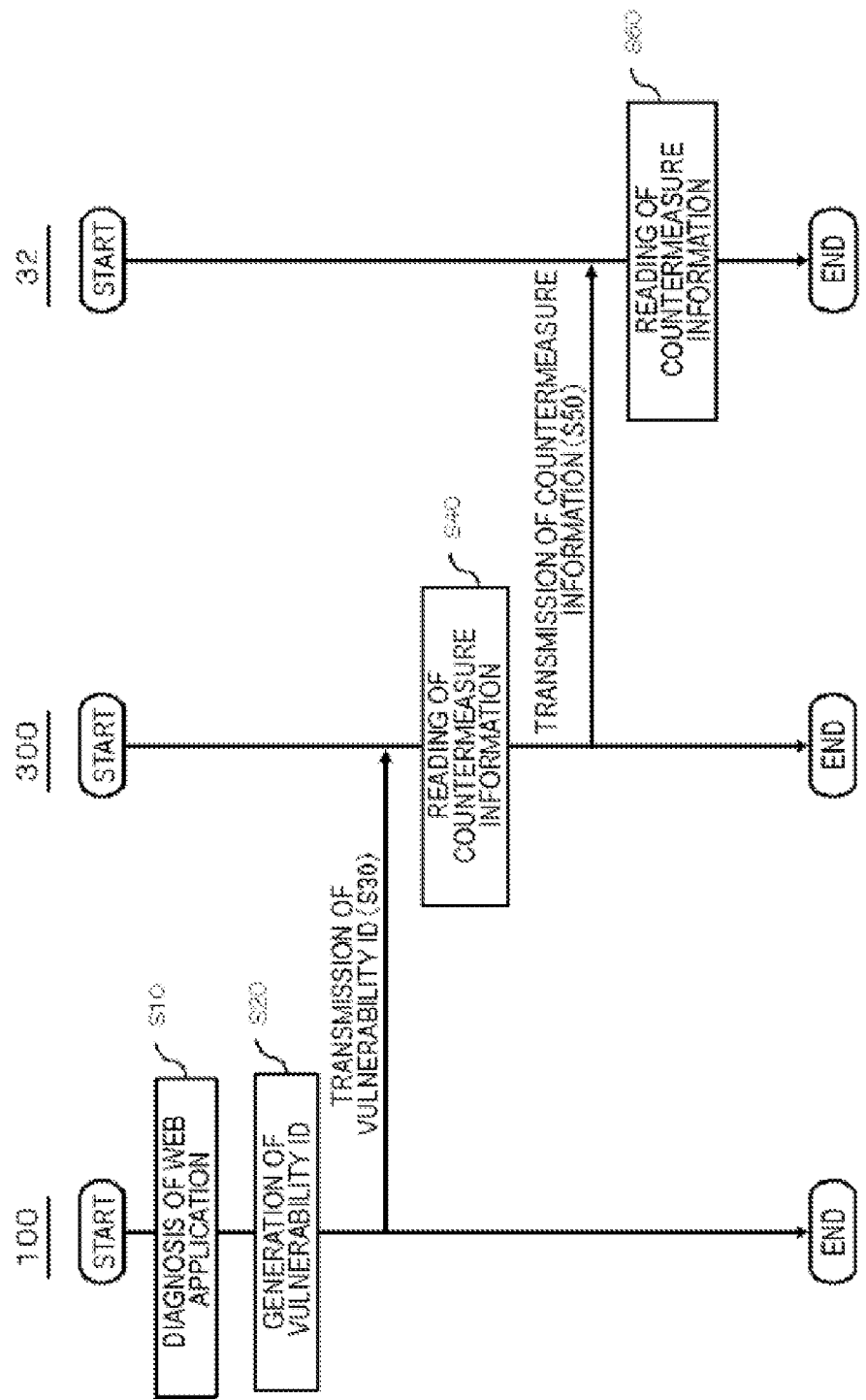
FIG. 5 is a flow chart showing the operation of the Web vulnerability repair apparatus shown in FIG. 1.

FIG. 5 is a flow chart showing the operation of the Web vulnerability repair apparatus 50 shown in FIG. 2. First, the diagnostic device 100 of the Web vulnerability repair apparatus 50 acquires a URL of a Web application that should be checked. Then, the diagnostic device 100 connects to the Web application indicated by the acquired URL, and recognizes the type of vulnerability and a vulnerable point of the Web application by performing a pseudo-attack (step S10). Then, the diagnostic device 100 generates a vulnerability ID corresponding to the recognized type of vulnerability (step S20), and matches the generated vulnerability ID with point specification information (for example, a combination of a URL and a parameter) indicating the recognized vulnerable point, and outputs them to the countermeasure information generation device 300 (step S30).

When the vulnerability information acquisition unit 310 receives the vulnerability ID and the point specification information, which are corresponded with each other, the repair information generation unit 330 of the countermeasure information generation device 300 reads countermeasure information corresponding to the received vulnerability ID from the countermeasure information storage unit 320 (step S40). Then, the repair information generation unit 330 determines the repair unit 32 as a transmission destination using the point specification information acquired by the vulnerability information acquisition unit 310, and transmits the countermeasure information read in step S40 to the repair unit 32 (step S50). The repair information generation unit 330 also transmits at least information of the place information, which specifies a parameter that is a source of the vulnerability.

The repair unit 32 reads the countermeasure information (including the information that specifies a parameter) transmitted from the countermeasure information generation device 300 and processes it (step S60). Specifically, the repair unit 32 makes the user terminal 20 connect to the Web application of the Web server 30 through the repair unit 32 of the Web vulnerability repair apparatus. The repair unit 32 performs processing according to the countermeasure information when making this connection.

Note that, although the countermeasure information configured with the countermeasure information generation device 300 is transmitted to the repair unit 32 through a communication network such as the global network 10 in the example described above, this countermeasure information may also be transmitted to the repair unit 32 through a removable memory device (for example, a USB memory).

In addition, although the repair unit 32 operates in the Web server 30 in the example described above, the repair unit 32 may operate in a firewall apparatus (not shown in the drawings) located between the Web server 30 and the global network 10.

Next, operations and effects of the present embodiment will be described. According to the present embodiment, the diagnostic device 100 diagnoses the vulnerability of a Web application, and determines the type of the vulnerability. Then, the countermeasure information generation device 300 reads countermeasure information corresponding to the determined type from the countermeasure information storage unit 320, and outputs the read countermeasure information. The output countermeasure information is loaded into the repair unit 32 of the Web server 30 through a communication network or a memory device. The repair unit 32 repairs the vulnerability of the Web application using the loaded countermeasure information. Therefore, it is possible to improve the security during the period from the time when a vulnerable part in a Web application is discovered to the time when it is manually repaired.

In addition, the diagnostic device 100 and the countermeasure information generation device 300 are installed at different places from the repair unit 32. Therefore, the countermeasure information stored in the countermeasure information generation device 300 can be quickly updated to up-to-date information by installing the diagnostic device 100 and the countermeasure information generation device 300 at the location where there is a person who creates the countermeasure information, for example. In addition, since it is not necessary to modify the Web server 30 when updating the countermeasure information, it is possible to reduce burden on the manager of the Web server 30.

(Second Embodiment)

Figure 6:
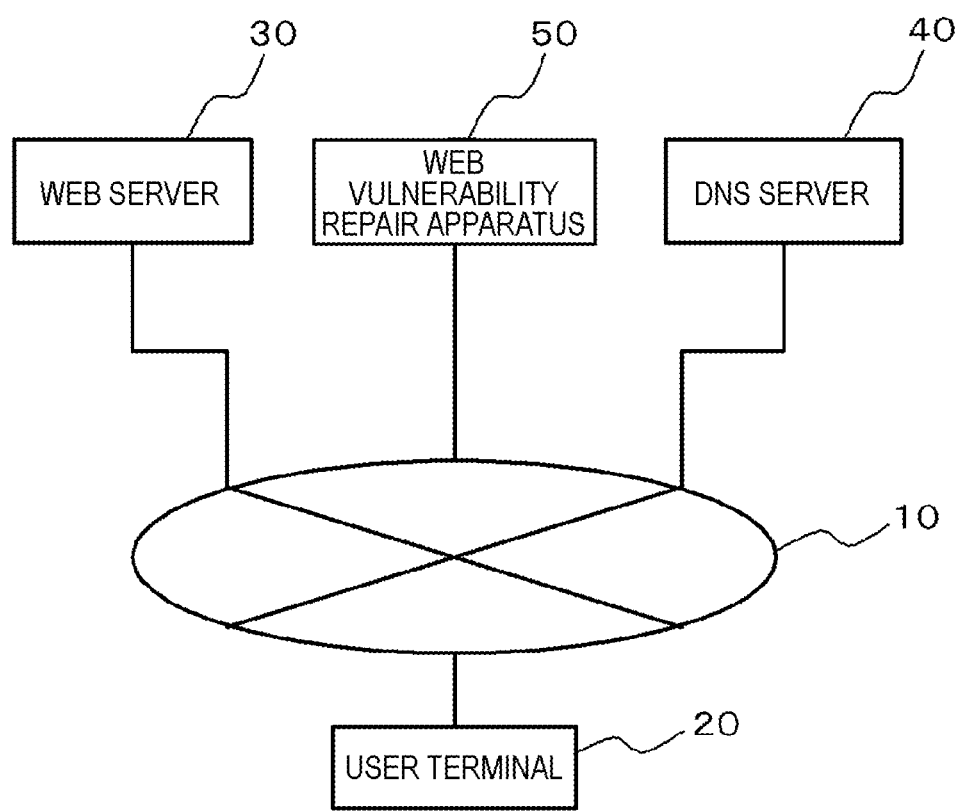
FIG. 6 is a view for explaining the usage environment of a Web vulnerability repair apparatus according to a second embodiment.

FIG. 6 is a view for explaining the usage environment of a Web vulnerability repair apparatus 50 according to a second embodiment. In the present embodiment, the Web vulnerability repair apparatus 50 detects the vulnerability of Web applications of the Web server 30 and the type of the vulnerability. The Web vulnerability repair apparatus 50 can acquire a repair program aimed to repair the vulnerability according to the type of vulnerability. In addition, the Web vulnerability repair apparatus 50 repairs the vulnerability of Web applications of the Web server 30 using the above-described repair program. By this repair, it is possible to improve the security during the period from the time when a vulnerable part in a Web application is discovered to the time when it is manually repaired.

The Web server 30 and the Web vulnerability repair apparatus 50 are connected to the global network 10. However, the Web server 30 may be connected to the global network 10 through a local network (not shown in the drawings). The Web vulnerability repair apparatus 50 may or may not belong to this local network. In addition, the Web server 30 and the Web vulnerability repair apparatus 50 are managed by the same DNS server 40. The DNS server 40 is placed in an environment connectable to the global network 10.

Figure 7:
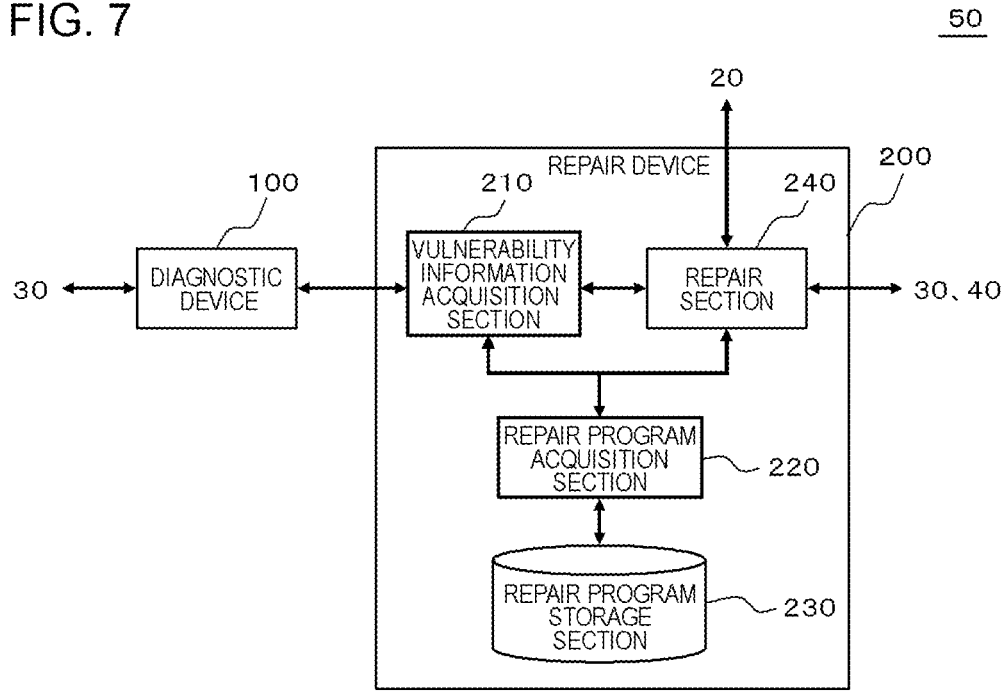
FIG. 7 is a block diagram showing the functional configuration of the Web vulnerability repair apparatus shown in FIG. 6.

FIG. 7 is a block diagram showing the functional configuration of the Web vulnerability repair apparatus 50. The Web vulnerability repair apparatus 50 includes a diagnostic device 100 and a repair device 200. The configuration of the diagnostic device 100 is the same as that in the first embodiment.

The repair device 200 includes a vulnerability information acquisition unit 210, a repair program acquisition unit 220, and a repair unit 240. The vulnerability information acquisition unit 210 acquires a vulnerability ID from the diagnostic device 100. The repair program acquisition unit 220 connects to a repair program storage unit 230. The repair program storage unit 230 stores a vulnerability ID and a repair program aimed to repair the vulnerability indicated by the vulnerability ID and corresponds them with each other, for each type of vulnerability of Web applications. In the present embodiment, the repair program storage unit 230 is formed as a part of the repair device 200. In addition, the repair program acquisition unit 220 acquires a repair program corresponding to the vulnerability ID, which the vulnerability information acquisition unit 210 has acquired from the repair program acquisition unit 220. The repair unit 240 repairs the vulnerability of the Web application using the repair program acquired by the repair program acquisition unit 220.

Note that, each component of the Web vulnerability repair apparatus 50 shown in FIG. 7 is not a configuration in a hardware unit but a block in a functional unit. Each component of the Web vulnerability repair apparatus 50 is implemented by any combination of hardware and software based on a CPU, a memory, a program implementing a component of this drawing which is loaded on the memory, a storage unit such as a hard disk which stores the program, and an interface for network connection, which are of any computer. In addition, there are various modifications in the implementation method and the apparatus.

Note that, the repair program stored in the repair program storage unit 230 is a program that performs each of the countermeasures shown in the countermeasure information in the first embodiment.

Figure 8:
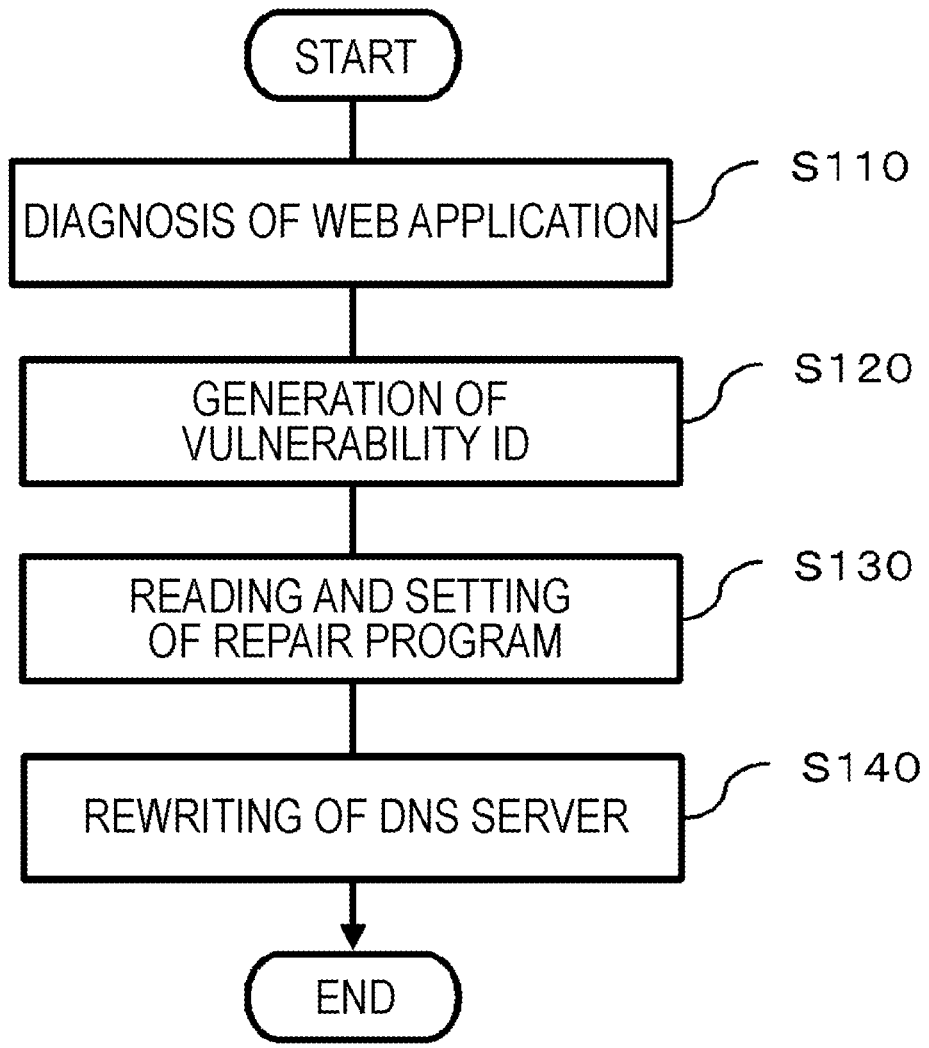
FIG. 8 is a flow chart showing the operation of the Web vulnerability repair apparatus shown in FIG. 7.

FIG. 8 is a flow chart showing the operation of the Web vulnerability repair apparatus shown in FIG. 7. First, the diagnostic device 100 of the Web vulnerability repair apparatus 50 acquires a URL of a Web application that should be checked. Then, the diagnostic device 100 connects to the Web application indicated by the acquired URL, and recognizes the type of a vulnerability and the point of the vulnerability in the Web application by performing a pseudo-attack (step S110). Then, the diagnostic device 100 corresponds a vulnerability ID, corresponding to the recognized type of the vulnerability, to point specification information (for example, a combination of a URL and a parameter) indicating the recognized vulnerable point, and outputs them to the repair device 200 (step S120).

When the vulnerability information acquisition unit 210 receives the vulnerability ID and the point specification information corresponded with each other, the repair program acquisition unit 220 of the repair device 200 reads a repair program corresponding to the received vulnerability ID from the repair program storage unit 230, outputs the repair program to the repair unit 240. Moreover, the repair unit 240 acquires point specification information from the vulnerability information acquisition unit 210. Then, the repair unit 240 performs repair processing using the acquired point specification information and the acquired repair program.

Specifically, the repair unit 240 configures such that the repair program is driven in the repair unit 240 (step S130). In addition, the repair unit 240 makes the user terminal 20 connect to the Web application of the Web server 30 through the repair unit 240 of the Web vulnerability repair apparatus. For example, the repair unit 240 modifies data managed by the DNS server 40 (combinations of URLs and IP addresses), so that the user terminal 20 connects to the Web application through the repair unit 240 (step S140). Note that, instead of the processing shown in step S140, the user terminal 20 may be made connect to the Web application through the repair unit 240 by rewriting the IP address of the repair unit 240 to the IP address which has been used as the IP address of the Web server 30, and assigning another IP address to the Web server 30.

Also in the present embodiment, it is possible to improve the security of Web applications without manually repairing the Web applications. Therefore, it is possible to improve the security during the period from the time when a vulnerable part in a Web application is discovered to the time when it is manually repaired.

(Third Embodiment)

Figure 9:
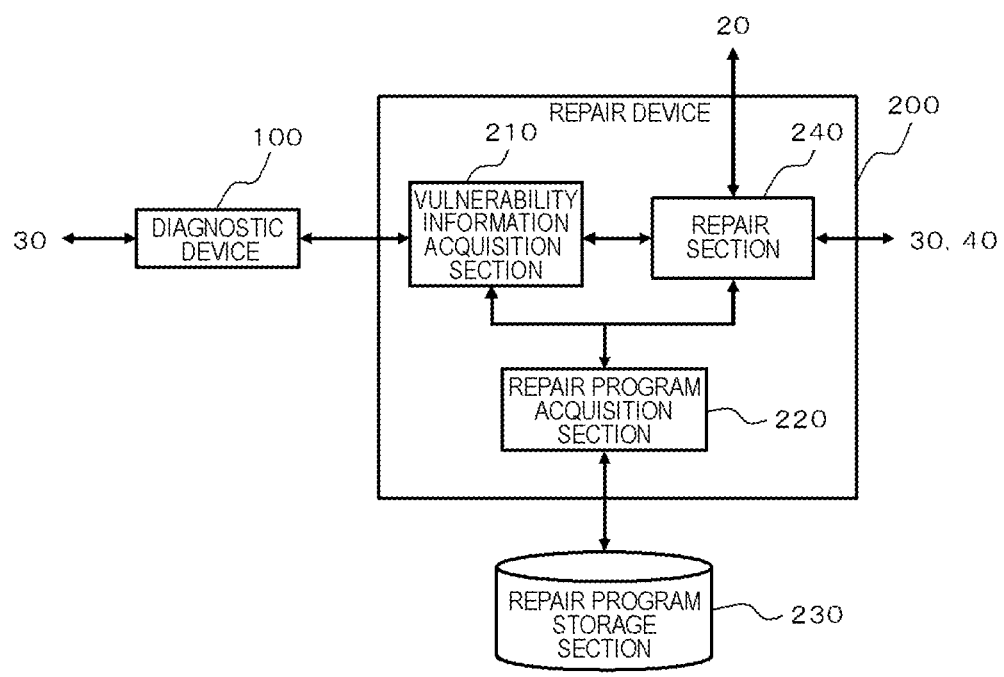
FIG. 9 is a block diagram showing the functional configuration of a Web vulnerability repair apparatus according to a third embodiment.

FIG. 9 is a block diagram showing the functional configuration of a Web vulnerability repair apparatus 50 according to a third embodiment. The Web vulnerability repair apparatus 50 according to the present embodiment has the same configuration as the Web vulnerability repair apparatus 50 according to the second embodiment except that the Web vulnerability repair apparatus 50 does not include the repair program storage unit 230.

In the present embodiment, the repair program storage unit 230 is provided in a server located outside the Web vulnerability repair apparatus 50. Thus, the repair program acquisition unit 220 acquires a repair program by connecting to the repair program storage unit 230 located outside.

Also in the present embodiment, the same effects as in the second embodiment can be achieved.

(Fourth Embodiment)

Figure 10:
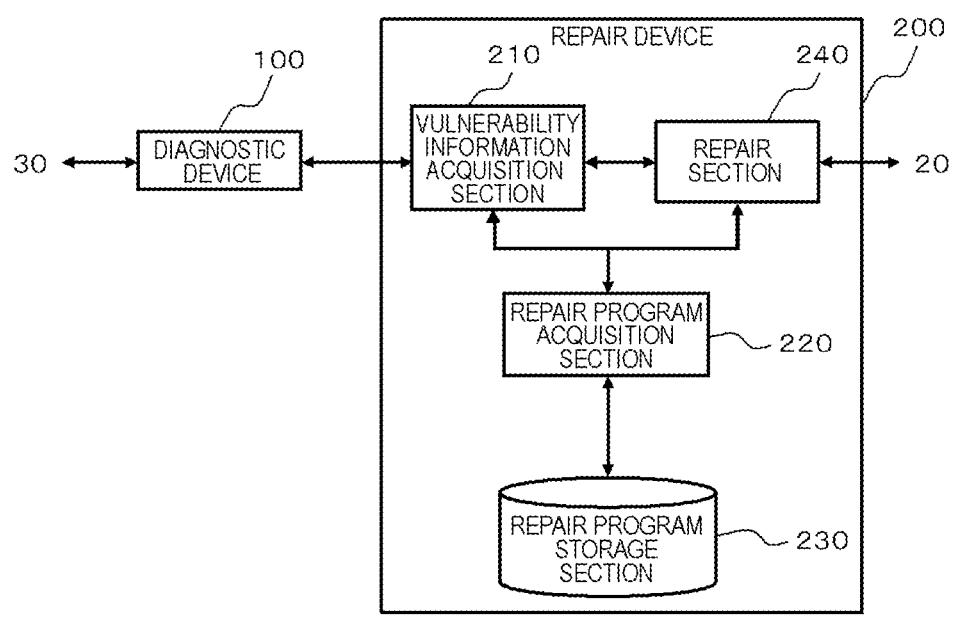
FIG. 10 is a block diagram showing the functional configuration of a Web vulnerability repair apparatus according to a fourth embodiment.

FIG. 10 is a block diagram showing the functional configuration of a Web vulnerability repair apparatus 50 according to a fourth embodiment. The Web vulnerability repair apparatus 50 according to the present embodiment has the same configuration as the Web vulnerability repair apparatus 50 according to the second or third embodiment except for the function of the repair unit 240. In the example shown in this drawing, the same case as in the second embodiment is shown.

In the present embodiment, the repair unit 240 repairs the vulnerability of Web applications by installing a repair program in the Web server 30 that has the Web applications. Also in the present embodiment, the same effects as in the second embodiment can be achieved.

While the embodiments of the present invention have been described with reference to the drawings, these are only an illustration of the present invention, and other various configurations may also be adopted.

This application claims priority to Japanese Patent Application No. 2010-164304, filed on Jul. 21, 2010, and the entire contents of which are incorporated herein.

The invention claimed is:

1. A Web vulnerability repair apparatus comprising:
a connection unit that connects to a countermeasure information storage unit, which stores vulnerability specification information and countermeasure information indicating a method of repairing vulnerability indicated by the vulnerability specification information so as to correspond to each other for each type of vulnerability of a Web application;
a vulnerability information acquisition unit that acquires the vulnerability specification information specifying the type of vulnerability of a target Web application; and
an output unit that connects to the countermeasure information storage unit through the connection unit, acquires the countermeasure information corresponding to the vulnerability specification information acquired by the vulnerability information acquisition unit, and outputs the acquired countermeasure information,
wherein the vulnerability information acquisition unit acquires point specification information, which includes a URL of the target Web application to be repaired and information specifying a vulnerable point of the target Web application, and which corresponds to the vulnerability specification information, and
wherein the output unit determines a Web server having the target Web application using the point specification information.

2. The Web vulnerability repair apparatus according to claim 1,
wherein the vulnerability specification information indicates vulnerability relating to cross-site scripting (XSS), and
wherein the countermeasure information indicates a process, the process including:
checking for whether or not there exists a symbol which makes inserted scripts enable an expression corresponding to tags or command syntax, and
blocking communication if said symbol exists.

3. The Web vulnerability repair apparatus according to claim 1, further comprising a diagnostic unit that determines whether or not there exists a vulnerability of the target Web application and determines the type of the vulnerability by analyzing the target Web application, and generates the vulnerability specification information.

4. A Web vulnerability repair apparatus comprising:
a connection unit that connects to a repair program storage unit, which stores vulnerability specification information and a repair program aimed to repair a vulnerability indicated by the vulnerability specification information so as to correspond to each other, for each type of a vulnerability of a Web application;
a vulnerability information acquisition unit that acquires the vulnerability specification information specifying the type of a vulnerability of a target Web application; and
a repair unit that connects to the repair program storage unit through the connection unit, acquires the repair program corresponding to the vulnerability specification information acquired by the vulnerability information acquisition unit, and repairs the vulnerability of the target Web application using the acquired repair program,
wherein:
the Web vulnerability repair apparatus is configured outside of a Web server running the target Web application,
the repair unit makes an external terminal connect to the target Web application through the Web vulnerability repair apparatus, the external terminal is used by a user of the target Web application,
the repair unit repairs the vulnerability of the target Web application by driving the repair program in the Web vulnerability repair apparatus,
the repair program causes the repair unit to modify a content of data sent from the external terminal to the Web server or a content of data reply from the Web server to the external terminal so that the vulnerability of the target Web application is repaired, and
the Web vulnerability repair apparatus is separate from the Web server and the external terminal, and serves as an intermediary therebetween.

5. The Web vulnerability repair apparatus according to claim 4,
wherein the repair unit makes an external terminal connect to the target Web application through the Web vulnerability repair apparatus by modifying data of the target Web application managed by a DNS server.

6. The Web vulnerability repair apparatus according to claim 4,
wherein the repair unit repairs the vulnerability of the target Web application by installing the repair program in an information processing apparatus having the target Web application.

7. The Web vulnerability repair apparatus according to claim 4, further comprising the repair program storage unit.

8. The Web vulnerability repair apparatus according to claim 4,
wherein the vulnerability information acquisition unit acquires point specification information, which includes a URL of the target Web application and information specifying a vulnerable point of the target Web application so as to be corresponded to the vulnerability specification information, and
wherein the repair unit repairs the vulnerability of the target Web application using the point specification information.

9. A Web vulnerability repair method comprising:
connecting, performed by a computer, to a countermeasure information storage unit, which stores vulnerability specification information and countermeasure information indicating a method of repairing vulnerability indicated by the vulnerability specification information so as to be corresponded with each other for each type of vulnerability of a Web application;
acquiring, performed by the computer, the vulnerability specification information specifying the type of vulnerability of a target Web application;
acquiring the countermeasure information corresponding to the acquired vulnerability specification information, and sending the acquired countermeasure information to a Web server providing the Web application, performed by the computer;
acquiring point specification information, which includes a URL of the target Web application to be repaired and information specifying a vulnerable point of the target Web application, and which corresponds to the vulnerability specification information, and
determining a Web server having the target Web application using the point specification information.

10. A Web vulnerability repair method comprising:
connecting, performed by a computer, to a repair program storage unit, which stores vulnerability specification information and a repair program aimed to repair a vulnerability indicated by the vulnerability specification information so as to correspond to each other, for each type of a vulnerability of a Web application;
acquiring, performed by the computer, the vulnerability specification information specifying the type of a vulnerability of a target Web application; and
acquiring the repair program corresponding to the acquired vulnerability specification information, and repairing the vulnerability of the target Web application using the acquired repair program, performed by the computer; and
wherein:
the computer is configured outside of a Web server running the target Web application,
an external terminal connects to the target Web application via the computer, and the external terminal is used by a user of the target Web application,
the Web Vulnerability repair method is performed by driving the repair program in the computer,
the repair program modifies a content of data sent from the computer to the Web server or a content of data reply from the Web server to the computer so that the vulnerability of the target Web application is repaired; and
the computer is separate from the Web server and the external terminal, and serves as an intermediary therebetween.

11. A non-transitory computer-readable storage medium that stores a program causing a computer to function as a Web vulnerability repair apparatus, the program causing the computer to realize:
a function of connecting to a countermeasure information storage unit, which stores vulnerability specification information and countermeasure information indicating a method of repairing vulnerability indicated by the vulnerability specification information so as to correspond to each other for each type of vulnerability of a Web application;
a function of acquiring the vulnerability specification information specifying the type of vulnerability of a target Web application;
a function of acquiring the countermeasure information corresponding to the acquired vulnerability specification information, and sending the acquired countermeasure information to a Web server providing the Web application;
a function of acquiring point specification information, which includes a URL of the target Web application to be repaired and information specifying a vulnerable point of the target Web application, and which corresponds to the vulnerability specification information, and
a function of determining a Web server having the target Web application using the point specification information.

12. A non-transitory computer-readable storage medium that stores a program causing a computer to function as a Web vulnerability repair apparatus, the program causing the computer to realize:
a function of connecting to a repair program storage unit, which stores vulnerability specification information and a repair program aimed to repair a vulnerability indicated by the vulnerability specification information so as to correspond to each other, for each type of a vulnerability of a Web application;
a function of acquiring the vulnerability specification information specifying the type of a vulnerability of a target Web application; and
a function of acquiring the repair program corresponding to the acquired vulnerability specification information, and repairing the vulnerability of the target Web application using the acquired repair program;
wherein:
the Web vulnerability repair apparatus is configured outside of a Web server running the target Web application,
an external terminal is configured to connect to the target Web application through the Web vulnerability repair apparatus, the external terminal being used by a user of the target Web application,
repairing the vulnerability of the target Web application is performed by driving the repair program in the Web vulnerability repair apparatus,
the repair program modifies a content of data sent from the external terminal to the Web server or a content of data reply from the Web server to the external terminal so that the vulnerability of the target Web application is repaired; and the Web vulnerability repair apparatus is separate from the Web server and the external terminal, and serves as an intermediary therebetween.

\* \* \* \* \*